United States Patent [19]

Schwarz et al.

[11] Patent Number: 5,393,307
[45] Date of Patent: Feb. 28, 1995

[54] REACTIVE DYESTUFF MIXTURE

[75] Inventors: Max Schwarz, Leverkusen; Joachim Grütze, Odenthal; Dietrich Hildebrand, Odenthal; Joachim Wolff, Odenthal; Frank-Michael Stöhr, Odenthal, all of Germany

[73] Assignee: Bayer Aktiengesellschaft, Leverkusen, Germany

[21] Appl. No.: 101,207

[22] Filed: Aug. 3, 1993

[30] Foreign Application Priority Data

Aug. 10, 1992 [DE] Germany .......................... 4226365.4
Sep. 7, 1992 [DE] Germany .......................... 4229836.9

[51] Int. Cl.$^6$ ............................................ C09B 62/00
[52] U.S. Cl. ........................................... 8/549; 8/641; 8/681; 8/682; 8/686; 8/687; 8/688; 8/918
[58] Field of Search .................... 8/543, 549, 641, 918

[56] References Cited

U.S. PATENT DOCUMENTS 4,988,803  1/1991  Stohr et al. .
5,076,811 12/1991  Lehmann et al. ...................... 8/641

FOREIGN PATENT DOCUMENTS 0545207  6/1993  European Pat. Off. .
4142766  2/1993  Germany .

Primary Examiner—Paul Lieberman
Assistant Examiner—Margaret Einsmann
Attorney, Agent, or Firm—Sprung Horn Kramer & Woods

[57] ABSTRACT

A reactive dyestuff mixture showing improved compatibility contains at least one vinylsulphonyltriazine dyestuff 1, at least one monofluorotriazine dyestuff 2 or fluorochloropyrimidine dyestuff 3 together with, if desired, additional dyestuffs.

6 Claims, No Drawings

REACTIVE DYESTUFF MIXTURE

The invention relates to mixtures of reactive dyestuffs which show improved compatibility compared with the individual components in the dyeing of cellulose or regenerated cellulose fibers.

Reactive dyestuffs are used for the dyeing of cellulose fibers in the form of their individual components or in the form of mixtures of various dyestuffs. In the mixtures, the reactivities of the individual components of the mixture should, if possible, be identical or at least similar in order to ensure compatibility of the dyestuffs during the dyeing process and thus to obtain a solid level dyeing. If reactive dyestuffs exhibit different reactivities, they are regarded as belonging to different dyestuff types which have to be applied using different alkali and temperature conditions. Different reactivities accordingly result in different exhaustion characteristics and thus the dyestuff combinations do not show ontone exhaustion during fixation.

Reactive dyestuffs for the dyeing of cellulose fibers are used in particular for dyeing fashionable shades of high colour strength. The particular degree of difficulty of this is how to produce dyeings of high levelness. The production of level dyeings based on a uniform reactive dyestuff molecule by means of the currently available dyestuffs suffers from substantial technical difficulties. Known dyestuffs from the class of the monofluorotrizaines or fluoropyrimidines, which have insufficient solubility in the presence of the added electrolyte which is necessary for the reaction yield and moreover exhibit a high reactivity level towards cotton, have a tendency to be absorbed and fixed unevenly, especially when applied in short liquor ratios, thus limiting their use for this purpose.

It is true that trichromatic dyestuff mixtures from the class of the vinylsulphonyltriazines already show good compatibility but they do not have the levelling power required for a completely on-tone exhaustion.

It is true that there are reactive-dyeing mixtures producing dyeings of good surface levelness that comprise reactive dyestuffs which in each case correspond to one reactive type, i.e. can be classed either as vinylsulphonyltriazines or as monofluorotriazines or monofluoropyrimidines, but they still have the disadvantage that when used as a trichromatic dyestuff system the yellow or blue or red component exhausts too quickly, as a result of which the hue in which the material is dyed undergoes a change during the dyeing process. This limits their usefulness in the case of relatively difficult-to-displace fabric grades and creasing in the dyeing machine. Since the temperature region of 60° C. is of particular interest for maintaining the quality of the cotton, such a mixture, which from the point of view of the mechanical displacing of the cotton should be used for dyeing at 80° C., cannot be used for the dyeing of articles which are advantageously dyed at 60° C.

The temperature region of 60° C. moreover has the additional advantage for dyehouses that dyeing can be carried out with an amount of electrolyte which is significantly reduced compared with that of the 80° C. method, thus giving significantly improved initial levelness in the first strike of the dyestuffs during the addition of salt.

Accordingly, when dyeing with the customary reactive dyestuff combinations based on identical or similar reactive groups, the hue of the dyeing is strongly dependent on the individual compatibility of the individual chromophores during fixation.

It is true that mixtures of reactive dyestuffs are already known but they do not yet satisfy all needs.

The object of the invention is to provide reactive dyestuff mixtures for on-tone trichromatic dyeing which, in combination with a high fixation yield, show a uniform shape of the fixation curve which is superior to that of the individual dyestuffs and in which an on-tone colour build-up takes place even at different salt, alkali and temperature conditions and at all depths of shade of a combination.

The dyestuff mixture should possess high solubility and electrolyte insensitivity and exhibit time- and hue-invariant level and reproducible dyeing under variable temperature, alkali and liquor conditions.

The present invention provides a dyestuff mixture of at least two reactive dyestuffs of the same hue, characterised in that at least one vinylsulphonyltriazine dyestuff 1 of the formula 1.1 to 1.5

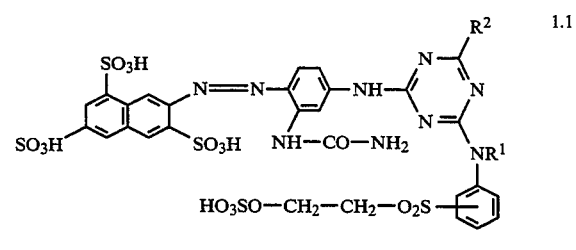

1.1

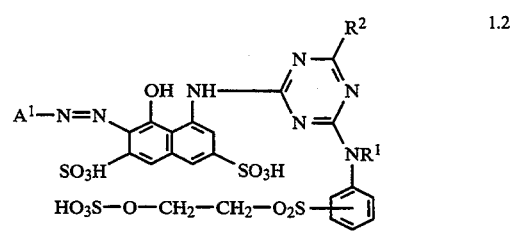

1.2

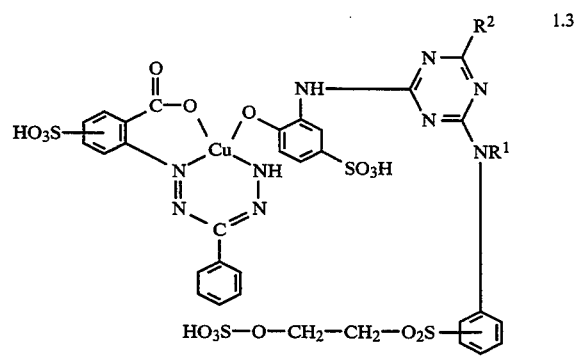

1.3

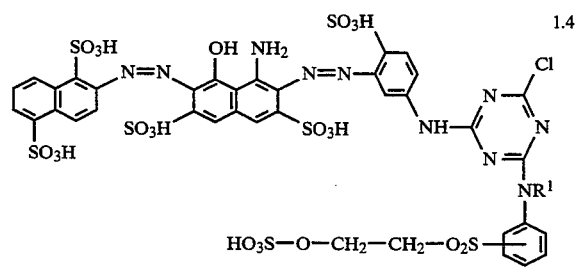

1.4

-continued
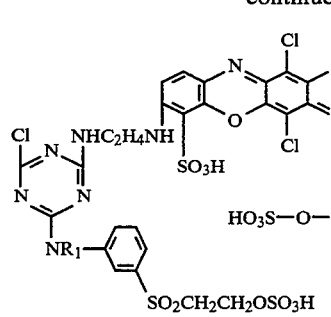
1.5
and at least one monofluorotriazine dyestuff 2 or fluoro-chloropyrimidine dyestuff 3 of the formulae
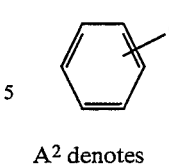
$A^2$ denotes
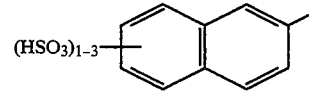
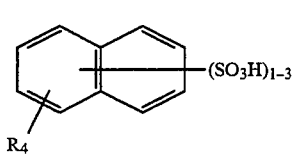
$R^1$ denotes H, $CH_3$, $-CH_2-CH_3$, $-(CH_2)_2CH_3$
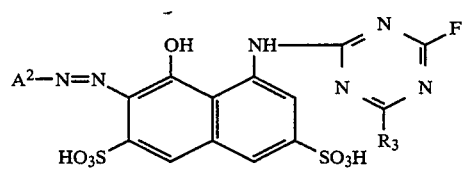  2.1
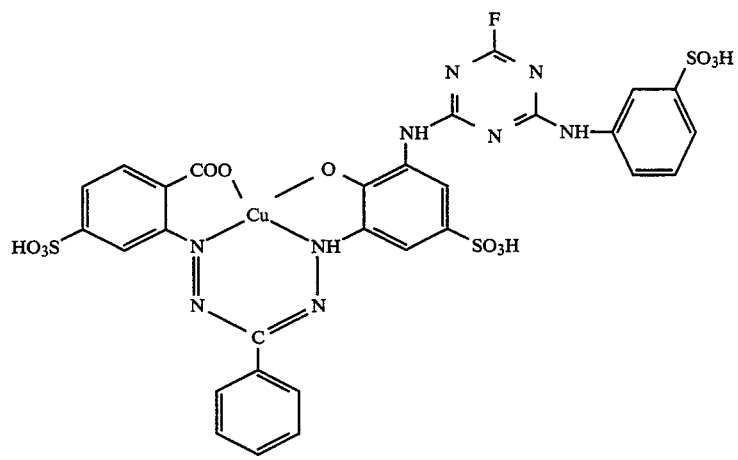  2.2
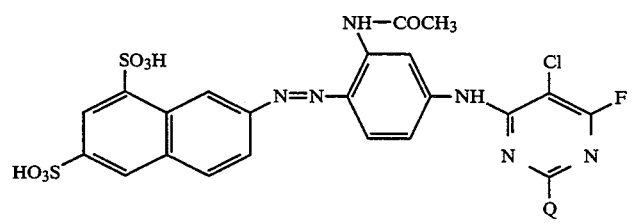  3.1
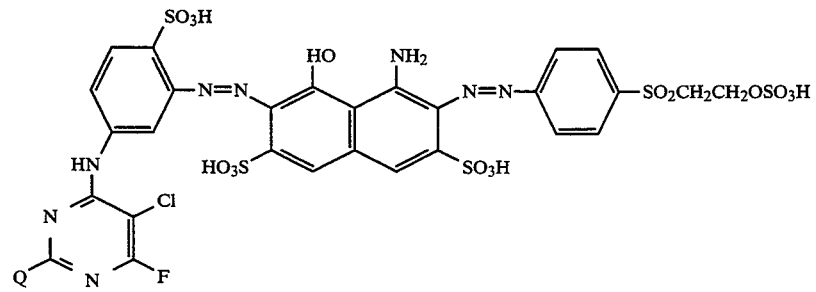  3.2
are contained therein, in which
$A^1$ denotes
$R^2$ denotes R³ denotes

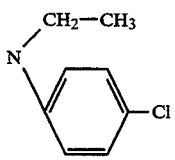

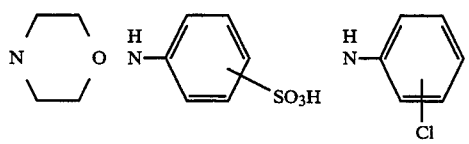

R⁴ denotes

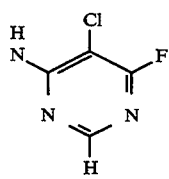

or H
Q denotes H, F.

In a particularly preferred embodiment, furthermore, the dyestuff 4.1 of the formula below is contained therein

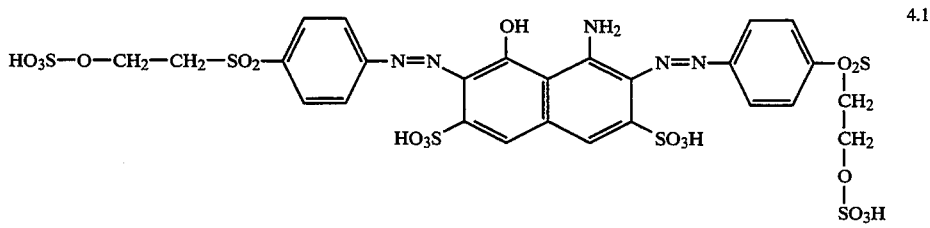

4.1

Particularly preferred mixtures are listed below:
Mixture 1: dyestuffs 1.2 and 3.1
Mixture 2: dyestuffs 1.2 and 2.1
Mixture 3: dyestuffs 1.3 and 2.2
Mixture 4: dyestuffs 1.4, 3.2 and 4.1
Mixture 5: dyestuffs 1.5 and 2.2
In a preferred embodiment, the mixtures contain, relative to the total dyestuff content:
Dyestuff 1: 40 to 60, in particular 40 to 55, % by weight
Dyestuff 2: 0 to 60, in particular 50 to 60, % by weight
Dyestuff 3: 0 to 60, in particular 32 to 50, % by weight
Dyestuff 4: 0 to 60, in particular 0 to 13, % by weight The mixtures according to the invention are suitable in particular for dyeing by the exhaust method, preferably in accordance with the following scheme:

| Time (min) | Temp. (°C.) | Operation |
|---|---|---|
| 0 | 30 | Addition of dyestuff |
| 10 | 30 | Addition of electrolyte (50 g/l of sodium chloride) |
| 20 | 30 | Addition of alkali (20 g/l of sodium carbonate) |
| 30 | 30 | Heating at 1°/minute |
| 60 | 60 | Dyeing |
| 120 | 60 | Discharge and refill |
| 130 | 50 | Warm rinse |
| 140 | 50 | Discharge and refill |
| 150 | 50 | Warm rinse |
| 160 | 50 | Discharge and refill |
| 170 | 80 | Hot rinse |
| 180 | 80 | Discharge and refill |
| 190 | 80 | Hot rinse |
| 200 | 80 | Discharge and refill |
| 215 | 95 | Hot rinse |
| 220 | 95 | Hot discharge via overflow |
| 225 | 80 | Warm rinse via overflow |
| 230 | 20 | Cold rinse |
| 240 | 20 | Remove dyed material. |

In addition, further dyestuffs or customary auxiliaries can be used. The dyestuff mixtures according to the invention in particular contain 1 to 50 parts of an inorganic salt, such as, for example, sodium chloride or sodium sulphate, per 100 parts of dyestuff. Furthermore, the mixtures according to the invention preferably contain a buffer, in particular an inorganic buffer giving a buffering range of between pH 6.5 and 7.5. For better handling, the mixtures according to the invention preferably contain dispersants, in particular 0.5 to 10 parts by weight of an organic, anionic dispersant, relative to the entire mixture, and a dustproofing agent, preferably 0.5 to 5 parts by weight, relative to the entire mixture.

Unless stated otherwise, the parts given below are by weight.

Example 1

100 parts of cotton knitted goods and 2 parts of reactive dyestuff mixture are introduced into 1000 parts of an aqueous dyeing liquor at 30° C. The mixture consists of 1 part each of a dyestuff 3.1 and of a dyestuff 1.1.

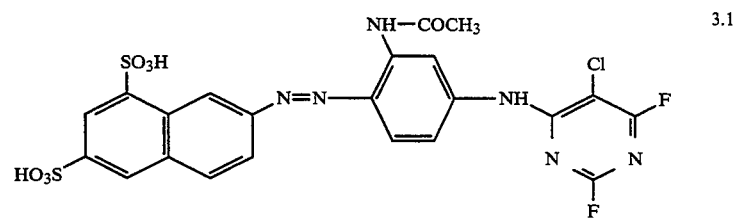

3.1

-continued

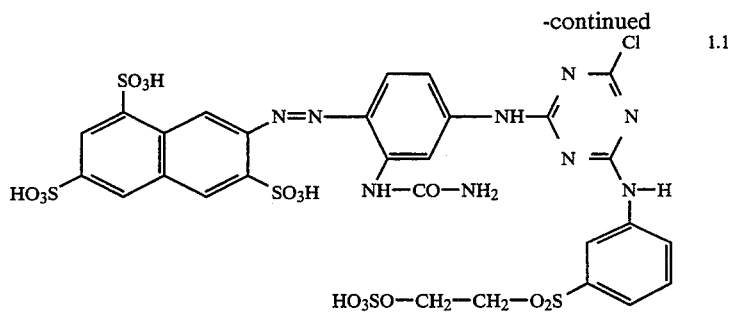

1.1

After the dyestuff mixture has been evenly distributed in the liquor and on the cotton, 50 parts of sodium chloride are added to the dye liquor, followed by 20 parts of sodium carbonate. This dyeing liquor is heated to 60° C. over a period of 30 minutes with vigorous agitation of liquor and goods and left at this temperature for 60 minutes.

The liquor is then discharged, and the goods are rinsed twice at 50° C. and twice at 80° C. They are then soaped at the boil for 15 minutes and rinsed with cold water, giving a level yellow dyeing having good fastness properties.

If the individual dyestuffs of the dyestuff mixtures are dyed in accordance with this dyeing scheme, the fixation curves shown in FIG. 1 are obtained. In these curves, the degree of fixation (in %) is plotted versus dyeing time. Degree of fixation is the fixation yield in % relative to the available dyestuff.

After addition of the fixing agent at 30° C., the more reactive dyestuff 3.1 begins to react immediately with the cellulose fiber.

As soon as the main reaction slows down, the heating phase to the final temperature of 60° C. is started, during which another acceleration of the reaction is observed.

Shortly after reaching 60° C., the fixation curve has reached the horizontal portion; dyeing is complete.

At the selected starting conditions, the less reactive dyestuff 1.1 first reacts slowly with the fiber. However, during the heating phase a distinct increase in the reaction rate takes place.

If dyeing is carried out with a mixture of dyestuffs 1.1 and 3.1, the individual components in the mixture exhibit compared with their respective types a more harmonic exhaustion behaviour which shows itself in a fixation curve which is flatter compared with the fixation curve of 3.1 and steeper compared with the fixation curve of 1.1, i.e. under identical fixation conditions the less reactive dyestuff 1.1 becomes fixed from the mixture more rapidly than would be expected from its type.

What is unexpected and surprising is the fact that the dyestuffs, when mixed with one another, follow a common fixation curve which is a measure of the positive mutual influence of the dyestuffs.

It is also surprising that the more reactive component goes on uniformly and in a high yield despite the fact that the fixation conditions of the material which have been chosen are apparently too severe. On the other hand, the less reactive mixing component gives good final yields despite the apparently too mild reaction conditions.

Example 2

100 parts of cotton knitted goods are treated at 30° C. with 1000 parts of an aqueous dye liquor containing 4 parts of a strength-standardised scarlet mixture consisting of 50 parts of dyestuff 2.1
25 parts of dyestuff 1.2
25 parts of dyestuff 1.1 (see Example 1)
½ parts of sodium bicarbonate
50 parts of sodium chloride and
20 parts of sodium carbonate (anhydrous)

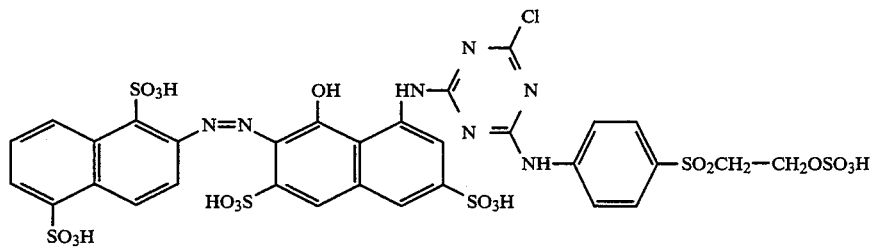

1.2

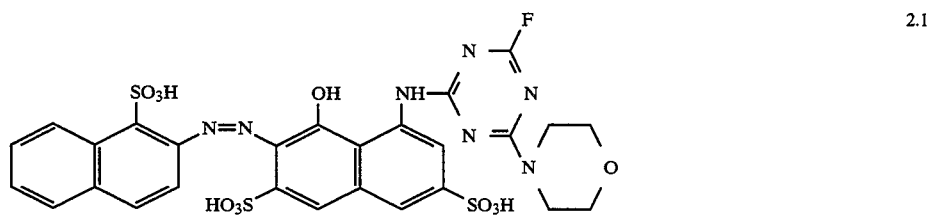

2.1

After the dyestuff has been evenly distributed on the fiber material at 30° C. over a period of 45 minutes, the liquor is heated to 60° C. over a period of 30 minutes with vigorous agitation of the goods and good liquor circulation, and the goods are treated at this temperature for 30 minutes. The liquor is then discharged, and the goods are rinsed twice at 50° C. and twice at 80° C.

Fresh liquor is then introduced and heated to 98° C. After 10 minutes, it is discharged, and the goods are again treated at 98° C. for 10 minutes. The liquor is then discharged, and the goods are rinsed with cold water, giving a brilliant scarlet dyeing have good fastness properties.

Example 3

100 parts of cotton knitted goods are treated in a shortliquor jet-dyeing machine at 30° C. with 400 parts of an aqueous liquor containing 1.5 parts of a scarlet mixture, dyestuffs according to Example 2, and
1 part of the dyestuff mixture consisting of
50 parts of dyestuff 1.3 and
50 parts of dyestuff 2.2 and
1 part of the dyestuff mixture consisting of
60 parts of dyestuff 1.1 (see Example 1) and
40 parts of dyestuff 3.1 (see Example 1) and furthermore
0.5 part of sodium bicarbonate
15 parts of sodium carbonate (anhydrous) and
30 parts of sodium chloride
in dissolved form.

temperature for 10 minutes each. The goods are then rinsed with cold water.

This gives a brown dyeing having good fastness properties.

Example 4

100 parts of cotton knitted goods and 2 parts of reactive dyestuff mixture are introduced into 1000 parts of an aqueous dyeing liquor at 30° C. The mixture consists of 1 part each of dyestuff 2.2 and 1.3 (see Example 3).

After the dyestuff mixture has been evenly distributed in the liquor and on the cotton, 50 parts of sodium chloride are added to the dye liquor, followed by 20 parts of sodium carbonate. This dyeing liquor is heated to 60° C. over a period of 30 minutes with vigorous agitation of liquor and goods and left at this temperature for 60 minutes.

The liquor is then discharged, and the goods are rinsed twice at 50° C. and twice at 80° C. They are then soaped at the boil for 15 minutes and rinsed with cold water, giving a level blue dyeing have good fastness properties.

If the individual dyestuffs of the dyestuff mixture are

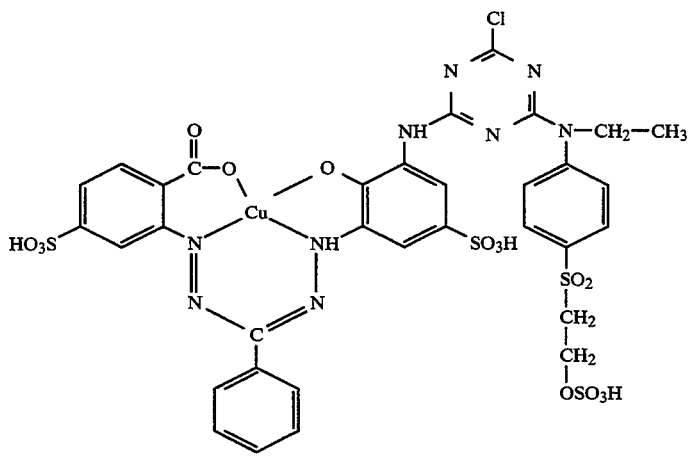

1.3

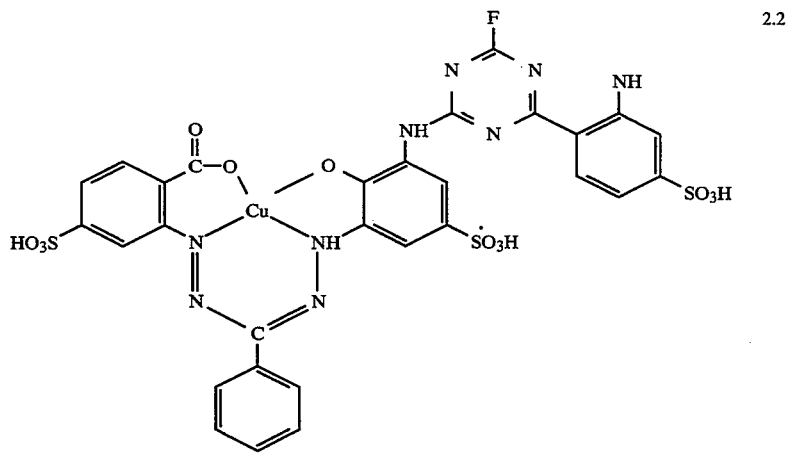

2.2

After a treatment of 30 minutes at this temperature, the liquor is heated to 60° C. over a period of 30 minutes, and dyeing at this temperature is continued for another 30 minutes with vigorous liquor circulation and agitation of the goods.

The liquor is then discharged, rinsed twice at 50° C. and twice at 80° C., and treated twice at the boiling used for dyeing, the fixation curves shown in FIG. 2 are obtained.

After addition of the fixing agent at 30° C., the more reactive dyestuff 2.2 begins to react immediately with the cellulose fiber. As soon as the main reaction slows down, the heating phase to the final temperature of 60°

C. is started, during which another acceleration of the reaction is observed.

Shortly after reaching 60° C., the fixation curve reaches the horizontal portion; dyeing is complete.

Under the selected starting conditions, the less reactive dyestuff 1.3 first reacts slowly with the fiber. However, during the heating phase a distinct increase in the reaction rate takes place.

If dyeing is carried out with a mixture of dyestuffs 2.2 and 1.3, the individual components of the mixture exhibit compared with their respective types a more harmonic exhaustion behaviour which shows itself in a fixation curve which is flatter compared with the fixation curve of 2.2 and steeper compared with the fixation curve of 1.3. This means that under identical fixation conditions the less reactive dyestuff 1.3 becomes fixed from the mixture more rapidly than would be expected from its type.

Example 5

100 parts of cotton knitted goods are treated in a jet-dyeing machine at 30° C. with 1000 parts of an aqueous liquor containing 5 parts of the navy reactive dyestuff mixture consisting of
32 parts of dyestuff 3.2
55 parts of dyestuff 1.4
13 parts of dyestuff 4.1
0.5 part of sodium bicarbonate
20 parts of sodium carbonate (anhydrous)
60 parts of sodium chloride in dissolved form.

This gives a level navy dyeing having good fastness properties.

Example 6

100 parts of cotton knitted goods and a combination of three reactive dyestuff mixtures are introduced at 30° C. into 1000 parts of an aqueous dye liquor:

Mixture 1 consists of 40 parts of the dyestuff of the formula 1.1 and
60 parts of the dyestuff of the formula 3.1
Mixture 2 consists of 50 parts of the dyestuff of the formula 1.2 and
50 parts of the dyestuff of the formula 2.1
Mixture 3 consists of 50 parts of the dyestuff of the formula 1.3 and
50 parts of the dyestuff of the formula 2.2,
each of the dyestuffs having the formula given in the previous Examples.

The following amounts are used per 1000 parts of the dye liquor:
Mixture 1: 0.55 part
Mixture 2: 0.66 part
Mixture 3: 0.66 part The liquor additionally contains 0.5 part of sodium bicarbonate, 20 parts of anhydrous sodium carbonate and 50 parts of sodium sulphate.

After 10 minutes, the dyeing liquor is heated to 60° C. over a period of 30 minutes with vigorous agitation of liquor and goods and left at this temperature for 30 minutes.

The liquor is then discharged, and the goods are

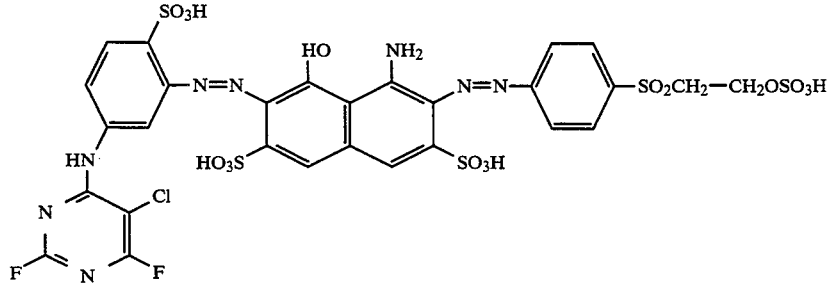

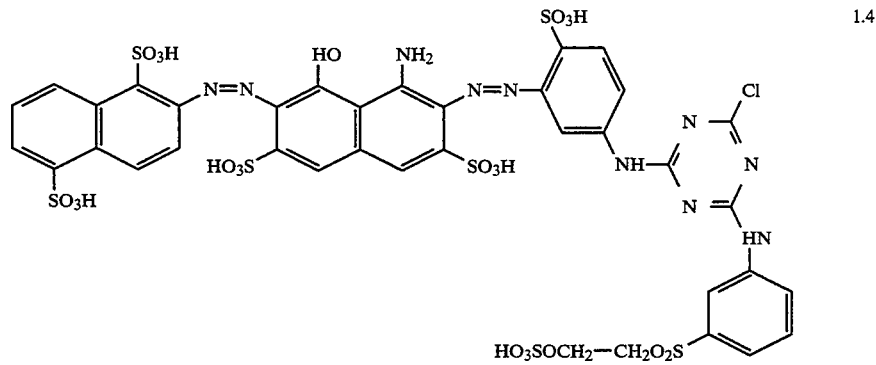

After even distribution of the adsorbed dyestuff on the cellulose fiber material, the liquor is evenly heated to 60° C. over a period of 30 minutes, and dyeing at this temperature is continued for another 60 minutes with vigorous liquor circulation and agitation of the goods.

The liquor is then discharged, the goods are rinsed twice with cold and hot water and treated twice for 15 minutes each at the boil.

rinsed twice at 50° C. and twice at 80° C. They are then soaped at the boil for 15 minutes and rinsed with cold water, giving a level brown dyeing having good fastness properties.

If the individual mixtures 1, 2 and 3 are used, the fixation curves shown in FIG. 3 are obtained. Shortly after reaching 60° C. the fixation curve reaches the horizontal portion; dyeing is complete.

If dyeing is carried out with a combination of the dyestuffs 3.1, 2.1 and 2.2 or a combination of the dyestuffs 1.1, 1.2 and 1.3, the individual components in these combinations exhibit a less harmonic exhaustion behaviour compared with the combination consisting of mixture 1, 2, 3 which shows itself in the fixation curve of 3.1, 2.1 and 2.2 in a steeper fixation curve compared with the fixation curve of 1, 2, 3 and compared with the fixation curve of 1.1, 1.2 and 1.3. This means that under identical fixation conditions the less reactive dyestuff becomes fixed from the claimed mixture more rapidly than would be expected from its type.

We claim:

1. A dyestuff mixture of at least two reactive dyestuffs wherein at least one dyestuff 1 selected from the group consisting of the dyestuffs of formulae 1.1, 1.2, 1.4 and 1.5

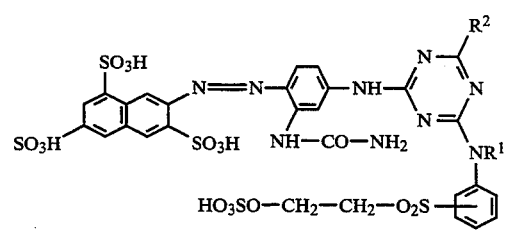

1.1

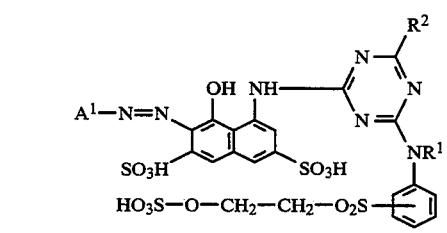

1.2

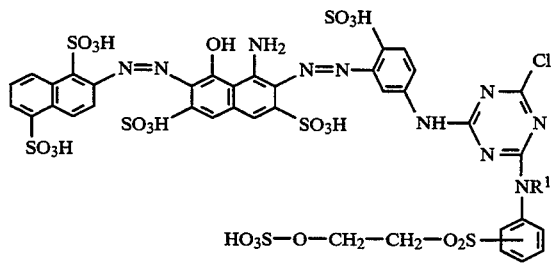

1.4

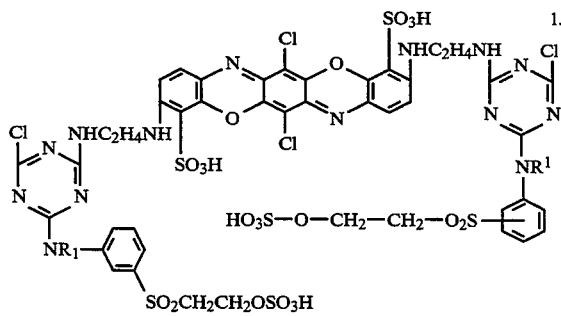

1.5 and at least one dyestuff 2, selected from the group consisting of the dyestuffs of formulae 2.1, 2.2, or dyestuff 3 selected from the group consisting of the dyestuffs of the formulae 3.1 and 3.2

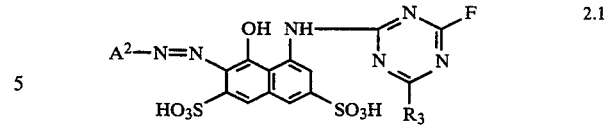

2.1

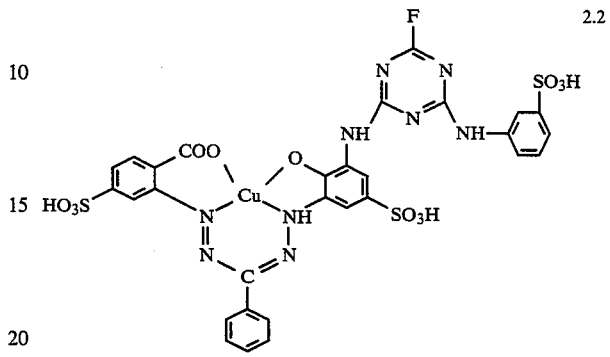

2.2

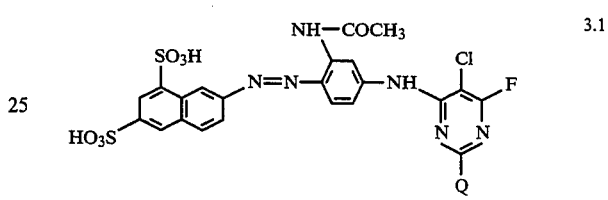

3.1

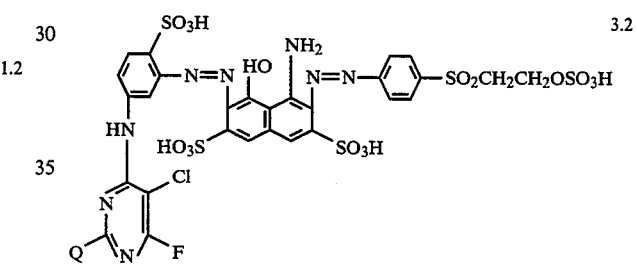

3.2 are contained therein, in which $A^1$ denotes

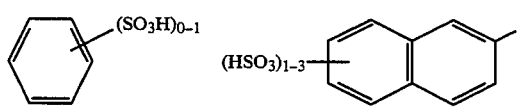

$A^2$ denotes

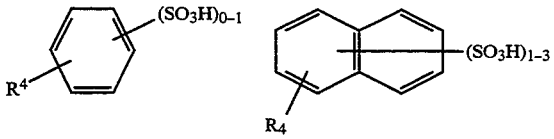

$R^1$ denotes H, $CH_3$, $-CH_2-CH_3$, $-(CH_2)_2CH_3$ $R^2$ denotes

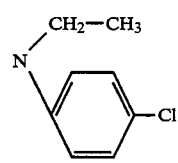

$R^3$ denotes

2. A dyestuff mixture according to claim 1, further containing the dyestuff of the formula 4.1 below

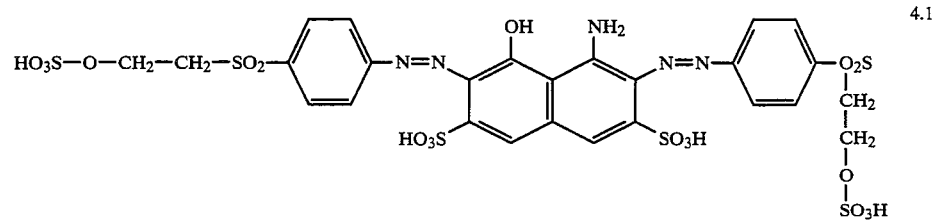

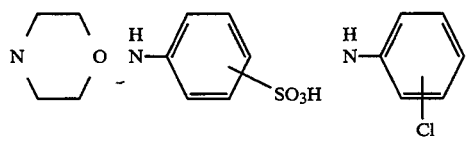

R⁴ denotes

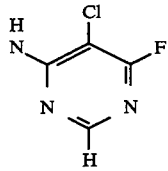

Q denotes H, F.

3. A dyestuff mixture according to claim 2, wherein the following amounts of dyestuffs, relative to the sum of dyestuffs, are contained therein:
Dyestuff 1: 40–60% by weight
Dyestuff 2: 0–60% by weight
Dyestuff 3: 0–60% by weight
Dyestuff 4.1: 0–60% by weight.

4. A dyestuff mixture according to claim 1, wherein the dyestuff mixture further contains 1 to 50 parts of an inorganic salt per 100 parts of dyestuff.

5. A mixture according to claim 1, wherein the dyestuff mixture further contains 1 to 5 parts of an inorganic buffer, 0.5 to 10 parts of a dispersant and 0.5 to 5 parts of a dustproofing agent per 100 parts of dyestuff and the mixture has a pH of 6.5 to 7.5.

6. A process for the dyeing of cellulose fibers or cellulose-containing fiber blends with a dyestuff mixture, by applying thereto a reactive dyestuff mixture according to claim 1.

* * * * *

UNITED STATES PATENT AND TRADEMARK OFFICE
CERTIFICATE OF CORRECTION

PATENT NO. : 5,393,307                                    Page 1 of 2
DATED     : February 28, 1995
INVENTOR(S) : Max Schwarz, et al.

It is certified that error appears in the above-identified patent and that said Letters Patent is hereby corrected as shown below:

| | |
|---|---|
| Title Page, U.S. PATENT DOCUMENTS | insert-- 4,557,731  12/1985  Sasakura, et al.<br>5,047,067  9/1991  Miyazaki, et al.<br>4,338,093  7/1982  Hildebrand, et al.<br>3,669,951  6/1972  Bien, et al.<br>3,910,758  10/1975  Bien, et al.<br>4,007,164  2/1977  Bien, et al. -- |
| Title Page, FOREIGN PATENT DOCUMENTS | insert--0478503  4/1992  European Pat. Office<br>3201114  7/1983  Germany-- |
| Title Page | insert--OTHER PUBLICATIONS<br>JP-A-03/244,670, Sumitomo (abstract) 10/1991<br>JP-A-03/188,167, Sumitomo (abstract) 8/91<br>JP-A-63/213,573, Sumitomo (abstract) 6/88 |
| Col. 4, Last Line | After "$R^2$ denotes" insert --$C1$,--. |
| Col. 14, Line 65 | After "$R^2$ denotes" insert --$C1$,--. |

UNITED STATES PATENT AND TRADEMARK OFFICE
CERTIFICATE OF CORRECTION

PATENT NO. : 5,393,307　　　　　　　　　　　　　　　Page 2 of 2

DATED　　　　: February 28, 1995

INVENTOR(S) : Max Schwarz, et al.

It is certified that error appears in the above-identified patent and that said Letters Patent are hereby corrected as shown below:

Col. 15, Line 25　　　　　　　After

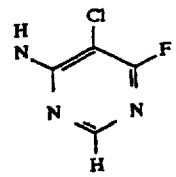

Insert --or H--

Signed and Sealed this

Twenty-second Day of February, 2000

Attest:

Q. TODD DICKINSON

Attesting Officer　　　　　Commissioner of Patents and Trademarks